United States Patent
MacLean et al.

(10) Patent No.: US 10,577,029 B2
(45) Date of Patent: Mar. 3, 2020

(54) SHAPE-MEMORY MATERIAL PROVIDING SOFT OPEN AND CLOSURE ASSISTANCE FOR TAILGATE

(71) Applicant: Ford Global Technologies, LLC, Dearborn, MI (US)

(72) Inventors: Eric Jay MacLean, Brighton, MI (US); Scott Christopher Sterbenz, Brownstown, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 191 days.

(21) Appl. No.: 15/806,504

(22) Filed: Nov. 8, 2017

(65) Prior Publication Data

US 2019/0136602 A1    May 9, 2019

(51) Int. Cl.
*B62D 33/027* (2006.01)
*E05F 15/60* (2015.01)
*B62D 33/03* (2006.01)
*E05F 1/10* (2006.01)

(52) U.S. Cl.
CPC .......... *B62D 33/0273* (2013.01); *E05F 15/60* (2015.01); *B62D 33/03* (2013.01); *E05F 1/1075* (2013.01); *E05Y 2201/654* (2013.01); *E05Y 2800/236* (2013.01); *E05Y 2900/532* (2013.01); *E05Y 2900/544* (2013.01); *E05Y 2900/546* (2013.01)

(58) Field of Classification Search
CPC . E05B 47/0009; E05B 79/20; B62D 33/0273; B62D 33/023; E05F 15/60; E05F 15/627; E05Y 2900/546; E05Y 2900/544; E05Y 2900/532
See application file for complete search history.

(56) References Cited

U.S. PATENT DOCUMENTS

| 6,068,321 A * | 5/2000 | Ooms ............... B62D 33/0273 296/146.4 |
| 6,832,801 B2 | 12/2004 | Zagoroff |
| 6,835,083 B1 | 12/2004 | Alacqua et al. |
| 7,063,377 B2 | 6/2006 | Brei et al. |
| 7,331,616 B2 * | 2/2008 | Brei .................... E05B 47/0009 292/100 |

(Continued)

FOREIGN PATENT DOCUMENTS

DE    102008012439 A1    9/2009

OTHER PUBLICATIONS

"Chevrolet Debuts Lightweight 'Smart Material' on Corvette" Published Feb. 12, 2013. Pulled from website http://media.gm.com/media/us/en/gm/news.detail.html/content/Pages/news/us/en/2013/Feb/0212-corvette.html Sep. 28, 2017.

*Primary Examiner* — Justin B Rephann
(74) *Attorney, Agent, or Firm* — David Coppiellie; Carlson, Gaskey & Olds, P.C.

(57) ABSTRACT

A motor vehicle according to an exemplary aspect of the present disclosure includes, among other things, a cargo box, a tailgate moveable relative to the cargo box between an open position and a closed position, and a cable affixed to the cargo box and the tailgate. At least a portion of the cable includes a shape-memory material. Additionally, the motor vehicle includes a controller configured to activate the shape-memory material when the tailgate moves between the open and closed positions. A method is also disclosed.

10 Claims, 4 Drawing Sheets

(56) References Cited

U.S. PATENT DOCUMENTS

| | | | |
|---|---|---|---|
| 7,810,852 B2* | 10/2010 | Alacqua | E05B 47/0009 |
| | | | 292/144 |
| 7,971,393 B2 | 7/2011 | Gao et al. | |
| 8,684,441 B2* | 4/2014 | Kerr, III | B60J 5/108 |
| | | | 296/50 |
| 2002/0139157 A1* | 10/2002 | Butera | E05B 47/0009 |
| | | | 70/256 |
| 2007/0063544 A1* | 3/2007 | Browne | B60R 21/38 |
| | | | 296/187.09 |
| 2008/0100092 A1* | 5/2008 | Gao | E05F 15/60 |
| | | | 296/146.11 |
| 2008/0120911 A1* | 5/2008 | Browne | E05B 47/0009 |
| | | | 49/352 |
| 2008/0197651 A1* | 8/2008 | Stratten | B62D 33/0273 |
| | | | 296/50 |
| 2009/0189406 A1 | 7/2009 | Gleason | |
| 2015/0330118 A1 | 11/2015 | Alexander et al. | |
| 2016/0130843 A1* | 5/2016 | Bingle | E05B 47/0009 |
| | | | 292/242 |

* cited by examiner

SHAPE-MEMORY MATERIAL PROVIDING SOFT OPEN AND CLOSURE ASSISTANCE FOR TAILGATE

TECHNICAL FIELD

This disclosure relates to a shape-memory material providing soft open and closure assistance for a tailgate of a pickup truck.

BACKGROUND

Pickup trucks typically include a latching tailgate that swings between an upright, closed position and a horizontal, open position. When in the closed position, the tailgate is latched to a cargo box. When open, on the other hand, the tailgate selectively provides access to the cargo box.

Commonly, tailgates are manually opened and closed by a user. For example, a handle on the tailgate can be pulled to unlatch the tailgate from the cargo box, permitting the tailgate to be moved to the open position. Some tailgates also include a powered latch, which unlatches the tailgate from the closed position when a user depresses a button on a remote control or on the exterior of the tailgate, as examples. Less commonly, pickup trucks may include powered tailgates, which are moved between the open and closed positions by one or more automated mechanisms. Powered tailgates are typically provided as an aftermarket accessory.

SUMMARY

A motor vehicle according to an exemplary aspect of the present disclosure includes, among other things, a cargo box, a tailgate moveable relative to the cargo box between an open position and a closed position, and a cable affixed to the cargo box and the tailgate. At least a portion of the cable includes a shape-memory material. Additionally, the motor vehicle includes a controller configured to activate the shape-memory material when the tailgate moves between the open and closed positions.

In a further non-limiting embodiment of the foregoing motor vehicle, the vehicle includes a current source. The controller is configured to activate the shape-memory material by commanding the current source to direct current through the shape-memory material.

In a further non-limiting embodiment of any of the foregoing motor vehicles, the controller is configured to command the current source to direct current through the shape-memory material when the tailgate moves from one of the open position and the closed position to the other of the open position and the closed position.

In a further non-limiting embodiment of any of the foregoing motor vehicles, the entirety of the cable is made of shape-memory material.

In a further non-limiting embodiment of any of the foregoing motor vehicles, the shape-memory material is a shape-memory alloy.

In a further non-limiting embodiment of any of the foregoing motor vehicles, the cable includes a first straight segment affixed to the cargo box, a second straight segment affixed to the tailgate, and a coiled segment between the first and second straight segments.

In a further non-limiting embodiment of any of the foregoing motor vehicles, at least a portion of the second straight segment is enclosed by a sheath.

In a further non-limiting embodiment of any of the foregoing motor vehicles, the second straight segment is not made of shape-memory material.

In a further non-limiting embodiment of any of the foregoing motor vehicles, the cargo box has first and second side walls, the cable is one of a first cable and a second cable, each of the first and second cables including a shape-memory material, the first cable is affixed to the first side wall and the tailgate, and the second cable is affixed to the second side wall and the tailgate.

In a further non-limiting embodiment of any of the foregoing motor vehicles, the shape-memory material is configured to return to a rebound shape upon application of heat.

A method according to an exemplary aspect of the present disclosure includes, among other things, activating a shape-memory material when moving a tailgate between an open position and a closed position. The tailgate is affixed to a cargo box by a cable made at least partially of the shape-memory material.

In a further non-limiting embodiment of the foregoing method, the method includes activating the shape-memory material when moving the tailgate from one of the open position and the closed position to the other of the open position and the closed position.

In a further non-limiting embodiment of any of the foregoing methods, the step of activating the shape-memory material includes applying heat to the shape-memory material.

In a further non-limiting embodiment of any of the foregoing methods, heat is applied to shape-memory material by directing current through the shape-memory material.

In a further non-limiting embodiment of any of the foregoing methods, the shape-memory material is activated when a controller commands a current source to direct current through the shape-memory material.

In a further non-limiting embodiment of any of the foregoing methods, the entirety of the cable is made of shape-memory material.

In a further non-limiting embodiment of any of the foregoing methods, the shape-memory material is a shape-memory alloy.

In a further non-limiting embodiment of any of the foregoing methods, the cable includes a first straight segment affixed to the cargo box, a second straight segment affixed to the tailgate, and a coiled segment between the first and second straight segments.

In a further non-limiting embodiment of any of the foregoing methods, the second straight segment is not made of shape-memory material.

In a further non-limiting embodiment of any of the foregoing methods, the cargo box has first and second side walls, the cable is one of a first cable and a second cable, each of the first and second cables including a shape-memory material, the first cable is affixed to the first side wall and the tailgate, and the second cable is affixed to the second side wall and the tailgate, and wherein the activating step includes activating the shape-memory material of both the first cable and the second cable.

DETAILED DESCRIPTION

This disclosure relates to a motor vehicle, such as a pickup truck, including a cargo box and a tailgate moveable relative to the cargo box between an open position and a closed position. The vehicle also includes a cable affixed to the cargo box and the tailgate. At least a portion of the cable includes a shape-memory material. Further, the vehicle includes a controller configured to activate the shape-memory material when the tailgate moves between the open and closed positions. When the tailgate opens, activating the shape-memory material resists an opening force of the tailgate, which prevents the tailgate from slamming down and thereby providing a "soft open." When closing the tailgate, activating the shape-memory material assists with closure of the tailgate.

Figure 1:
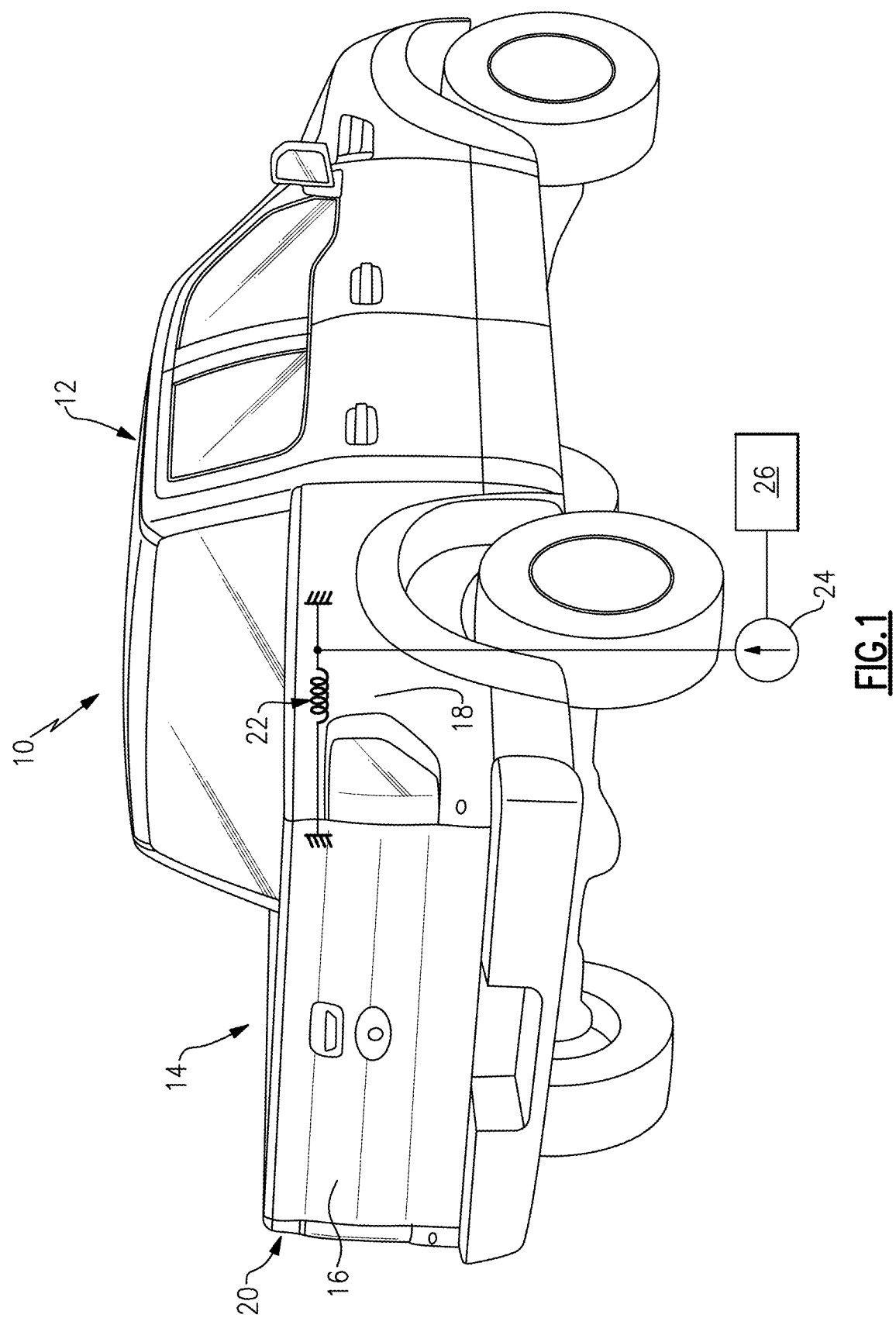
FIG. 1 is a rear-perspective view of a motor vehicle, which in this example is a pickup truck.

FIG. 1 illustrates a motor vehicle 10, which in this example is a pickup truck. The vehicle 10 includes a passenger cabin 12 and a cargo box 14. The vehicle 10 further includes a tailgate 16 configured to move between an open position (FIG. 6) and a closed position, which is shown in FIG. 1, to allow access to the cargo box 14. Along the sides, the cargo box 14 includes first and second side rails 18, 20. When in the closed position, the tailgate 16 is configured to latch relative to the first and second side rails 18, 20. While a pickup truck is shown in FIG. 1, this disclosure extends to other types of vehicles.

FIG. 1 schematically illustrates a cable 22 affixed to the cargo box 14 at one end and affixed to the tailgate 16 at the other end. Specifically, the cable 22 is affixed to the first side rail 18 at one end and to the tailgate 16 at the other. While not shown in FIG. 1, it should be understood that another substantially similar cable is affixed to the second side rail 20 and the tailgate 16.

The cable 22 is generally configured to support a load placed on the tailgate 16 when the tailgate 16 is in the open position. In this disclosure, the cable 22 is also configured to provide a soft open feature and assist with closure of the tailgate 16. As such, at least a portion of the cable 22 is made of a shape-memory material, such as a shape-memory alloy (SMA). Shape-memory materials are deformable and are configured to return, or "rebound," to their original shape, or their "rebound shape," upon application of heat.

In this disclosure, heat is applied to the shape-memory material by directing electric current through the shape-memory material. To this end, the cable 22 is electrically coupled to a current source 24, which is electrically coupled to a controller 26. The controller 26 is configured to command the current source 24 to direct current through the cable 22, thereby heating the shape-memory material and activating the shape-memory material, which urges the shape-memory material to rebound back to its rebound shape. Again, while not shown in FIG. 1, the controller 26 is also configured to direct current through another, similar cable affixed to the second side rail 20 and the tailgate 16. The current source 24 and controller 26 may be coupled to the cables in parallel, for example.

The controller 26 is shown schematically in FIG. 1. It should be understood that the controller 26 could be part of an overall vehicle control module, such as a vehicle system controller (VSC), or could alternatively be a stand-alone controller separate from the VSC. Further, the controller 26 may be programmed with executable instructions for interfacing with and operating the various components of the vehicle 10. The controller 26 additionally includes a processing unit and non-transitory memory for executing the various control strategies and modes of the vehicle system. The current source 24 is also shown schematically in FIG. 1, and is an electronic circuit that is responsive to instructions from the controller 26 to deliver electric current. While the current source 24 and controller 26 are shown separately, the controller 26 could include the current source 24 in some examples.

Figure 2:
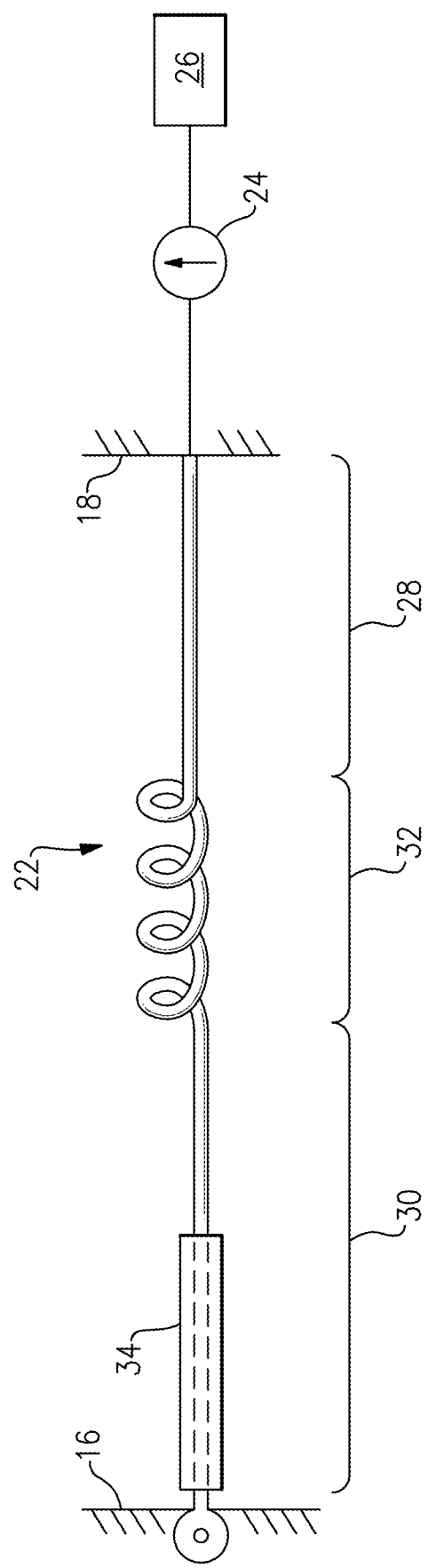
FIG. 2 schematically illustrates an example cable.

FIG. 2 schematically illustrates the cable 22 in more detail. In this example, the cable 22 includes a first straight segment 28 affixed to the cargo box 14, and in particular affixed to the first side rail 18. The cable 22 also includes a second straight segment 30 affixed to the tailgate 16, and additionally includes a coiled segment 32 between the first and second straight segments 28, 30. Within the first and second straight segments 28, 30, the cable 22 is substantially straight, and resembles a substantially straight wire. Within the coiled segment 32, the cable 22 is formed into the shape of a helix and includes a plurality of coils. The cable 22 can be formed using any known manufacturing technique.

The first straight segment 28 and the coiled segment 32 may be located interiorly of the first side wall 18, and thus protected from the outside environment. At least a portion of the second straight segment 30, however, may be exposed to the outside environment when the tailgate is not in the closed position. As such, in one example, at least a portion of the second straight segment 30 of the cable 22 is covered with a sheath 34. The sheath 34 may be a polymer coating configured to protect the cable 22 from the outside environment. The sheath 34 may be provided by an overmolding or co-extrusion process. Further, while in FIG. 2 the sheath 34 covers only a portion of the second straight segment 30, it should be understood that the sheath 34 could cover the entirety of the second straight segment 30. It should also be understood that the cable 22 does not require a sheath.

While a particular cable 22 is illustrated, it should be understood that this disclosure is not limited to the details of the cable 22 shown in FIGS. 1 and 2. For instance, the coiled segment 32 could include any number of coils. Further, the first straight segment 28 could be eliminated, in which case the coiled segment 32 would be affixed to the first side rail 18, for example. Other modifications to the cable 22 come within the scope of this disclosure.

The cable 22 is at least partially formed of shape-memory material, as mentioned above. In one example, at least the coiled segment 32 is formed of shape-memory material. In another example, at least the first straight segment 28 and the coiled segment 32 are formed of shape-memory material. In a further example, the entirety of the cable 22 is formed of shape-memory material. Again, the shape-memory material can be an SMA material, such as an SMA wire, and can be provided by any known shape-memory alloy, such as copper-aluminium-nickel and nickel-titanium (NiTi) alloys, as examples. This disclosure extends to other shape-memory materials, including but not limited to materials created by alloying zinc, copper, gold and iron.

In another example, at least a portion of the second straight segment 30 is not formed of a shape-memory material. For instance, the portion of the cable 22 beneath the sheath 34 may be provided by another type of metallic material, such as steel or a titanium (Ti) or nickel (Ni) based material, which is then co-extruded with the remainder of the cable 22.

The cable 22 is formed in an original shape, such as the shape shown in FIG. 2, and is configured to deform relative to that original shape when the tailgate 16 moves from the closed position to the open position. In one particular example, the coiled segment 32 of the cable 22 is configured to elongate under tension as the tailgate 16 moves from the closed position to the open position.

Figure 3:
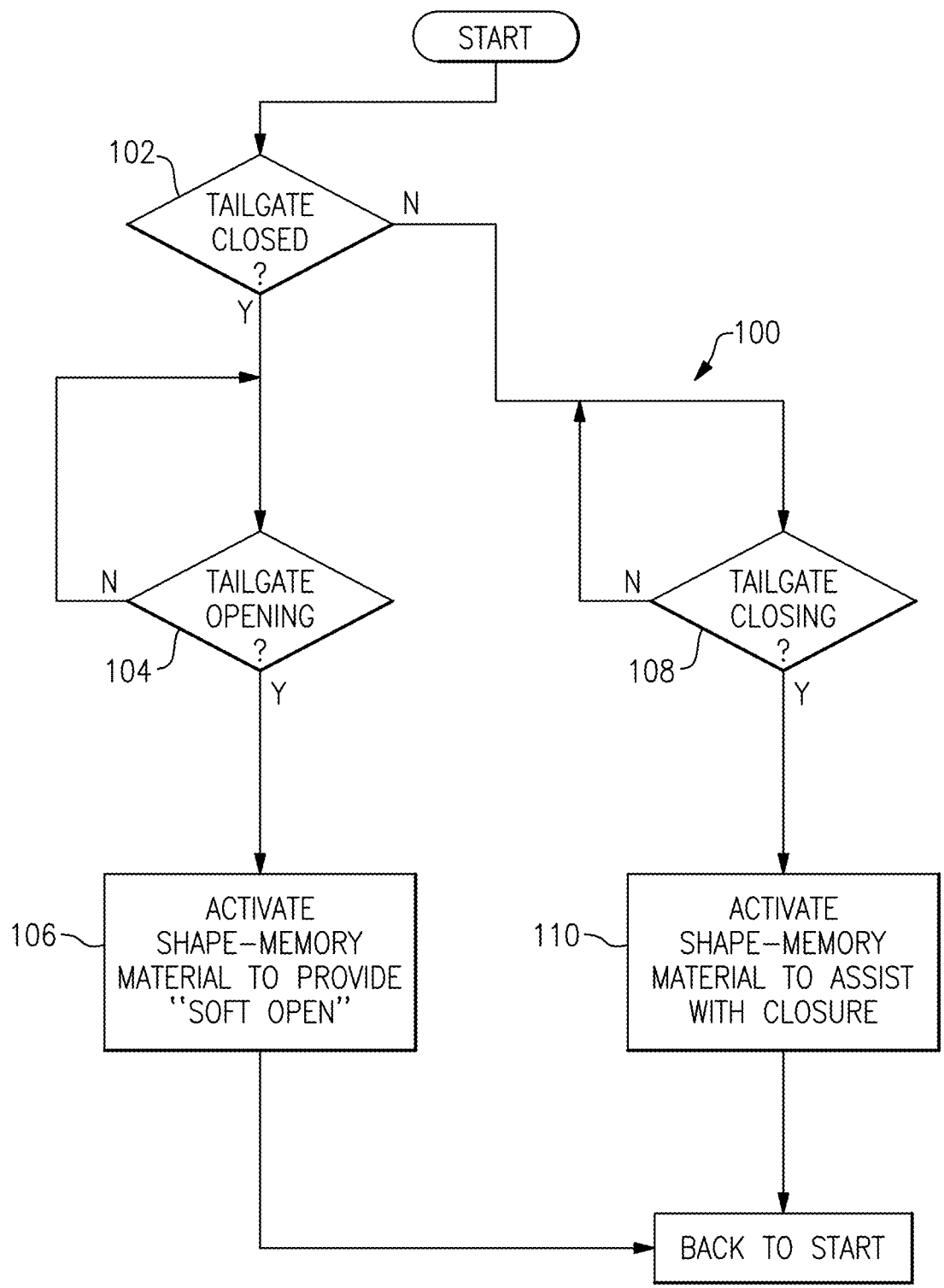
FIG. 3 is a flow chart representative of an example method.
Figure 4:
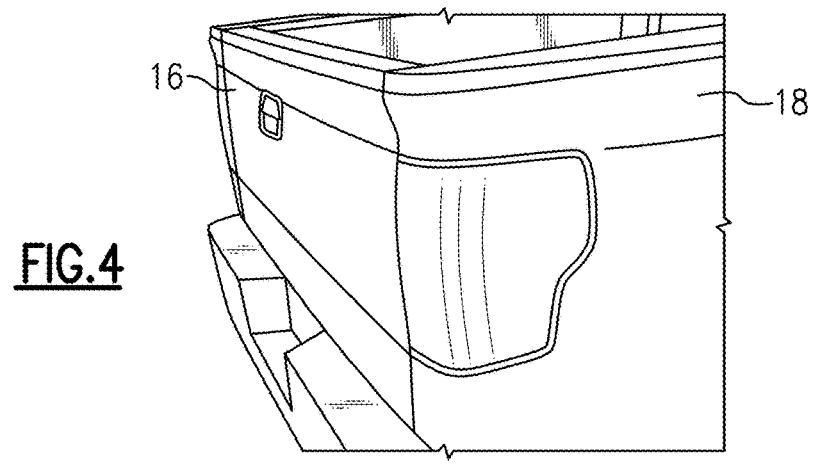
FIG. 4 is a rear-perspective view of a portion of a motor vehicle, and in particular illustrates a tailgate in a closed position.
Figure 5:
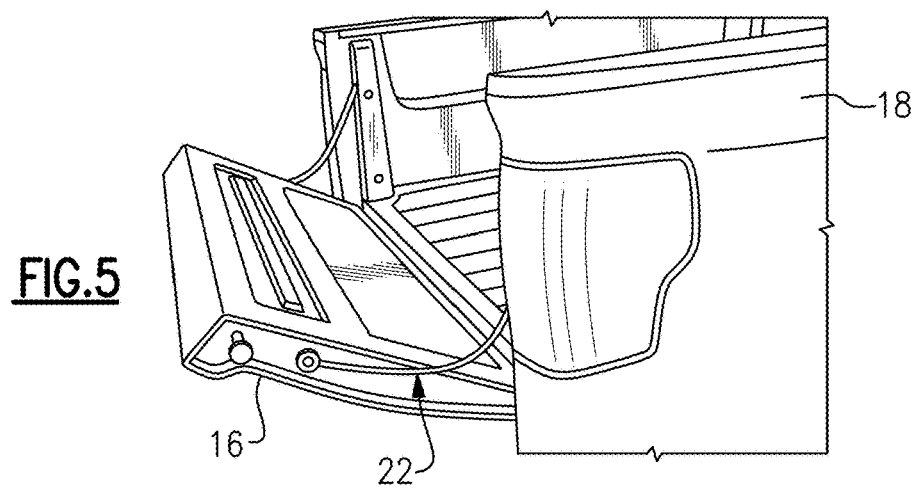
FIG. 5 is a rear-perspective view of a portion of a motor vehicle, and in particular illustrates a tailgate between a closed position and an open position.
Figure 6:
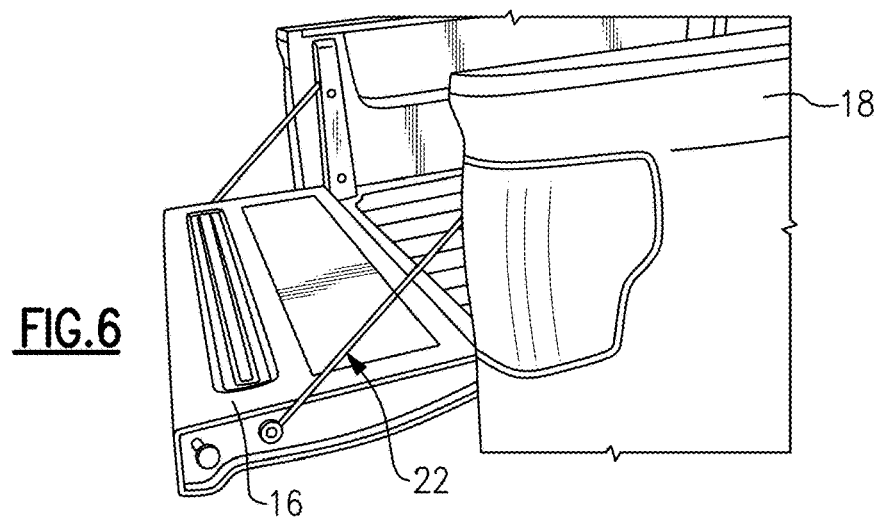
FIG. 6 is a rear-perspective view of a portion of a motor vehicle, and in particular illustrates a tailgate in an open position.

FIG. 3 is a flow chart representative of a method 100 of this disclosure. In particular, using the method 100, the shape-memory material of the cable 22 is selectively activated to provide a soft open feature and to assist with tailgate closure. It should be understood that the method 100 is performed by the components discussed above, including the controller 26. FIGS. 4-6 illustrate the tailgate 16 between the closed position, a partially open position, and the open position, respectively.

With joint reference to FIGS. 3-6, the method 100 begins at 102, at which point the controller 26 determines whether the tailgate 16 is closed, as shown in FIG. 4. If so, the controller 26 determines whether the tailgate 16 is opening, at 104. In one example, the controller 26 is configured to determine that the tailgate 16 is opening based on information from a sensor mounted adjacent to the tailgate 16. The sensor may be a Hall-effect type sensor, a strain sensor, or any other type of sensor. Alternatively, if the tailgate 16 includes a powered latch configured to automatically unlatch the tailgate 16, the controller 26 determines that the tailgate 16 is opening when a user activates the powered latch.

When the tailgate 16 begins to open, as shown in FIG. 5, the shape-memory material of the cable 22 begins to deform from its rebound shape. For example, the coiled segment 32 may become elongated. Alternatively or additionally, one or more of the straight segments 28, 30 may become elongated. At 106, the controller 26 activates the shape-memory material by commanding the current source 24 to direct current through the cable 22, thereby heating the shape-memory material and urging the shape-memory material to rebound back to its rebound shape. The level of current directed through the cable 22 is such that the shape-memory material will not overcome the force of the tailgate 16 opening, but is enough to soften the opening force of the tailgate 16 and prevent it from slamming by the time the tailgate 16 reaches the open position, shown in FIG. 6. Thus, activating the shape-memory material provides a "soft open" feature.

In addition to providing a "soft open" feature, the shape-memory material can also be activated to assist with closure of the tailgate 16. Returning back to the beginning of the method 100, if, at 102, the controller 26 determines that the tailgate 16 is not closed (e.g., in the open position of FIG. 6), then the controller 26 next determines whether the tailgate 16 is closing, at 108. Like in step 104, the controller 26 can determine whether the tailgate 16 is closing based on information from a sensor, for example. If the controller 26 determines that the tailgate 16 is closing (i.e., moving from the position of FIG. 6 to the position of FIG. 4), the controller 26 activates the shape-memory material, at 110, by directing current through the cable 22. Doing so urges the shape-memory material to rebound to its rebound shape, which assists with closure of the tailgate 16. In one example, the level of current directed through the cable 22 does not create enough force to close the tailgate 16 in and of itself, but substantially reduces the amount of force a user needs to apply to the tailgate 16.

It should be understood that terms such as "about," "substantially," and "generally" are not intended to be boundaryless terms, and should be interpreted consistent with the way one skilled in the art would interpret those terms. Further, directional terms such as "top," "bottom," "side," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a cargo box;
   a tailgate moveable relative to the cargo box between an open position and a closed position;
   a cable affixed to the cargo box and the tailgate, wherein at least a portion of the cable includes a shape-memory material; and
   a controller configured to activate the shape-memory material when the tailgate moves between the open and closed positions such that, when the tailgate moves to the open position, activation of the shape-memory material resists an opening force of the tailgate and, when the tailgate moves to the closed position, activation of the shape-memory material assists with closure of the tailgate.

2. The motor vehicle as recited in claim 1, further comprising:
   a current source, wherein the controller is configured to activate the shape-memory material by commanding the current source to direct current through the shape-memory material.

3. The motor vehicle as recited in claim 2, wherein the controller is configured to command the current source to direct current through the shape-memory material when the tailgate moves from one of the open position and the closed position to the other of the open position and the closed position.

4. The motor vehicle as recited in claim 1, wherein the entirety of the cable is made of shape-memory material.

5. The motor vehicle as recited in claim 1, wherein the shape-memory material is a shape-memory alloy.

6. The motor vehicle as recited in claim 1, wherein:
   the cargo box has first and second side walls,
   the cable is one of a first cable and a second cable, each of the first and second cables including a shape-memory material,
   the first cable is affixed to the first side wall and the tailgate, and
   the second cable is affixed to the second side wall and the tailgate.

7. The motor vehicle as recited in claim 1, wherein the shape-memory material is configured to return to a rebound shape upon application of heat.

8. A motor vehicle, comprising:
a cargo box;
a tailgate moveable relative to the cargo box between an open position and a closed position;
a cable affixed to the cargo box and the tailgate, wherein at least a portion of the cable includes a shape-memory material; and
a controller configured to activate the shape-memory material when the tailgate moves between the open and closed positions,
wherein the cable includes a first straight segment affixed to the cargo box, a second straight segment affixed to the tailgate, and a coiled segment between the first and second straight segments.

9. The motor vehicle as recited in claim 8, wherein at least a portion of the second straight segment is enclosed by a sheath.

10. The motor vehicle as recited in claim 8, wherein the second straight segment is not made of shape-memory material.

\* \* \* \* \*